United States Patent [19]

Nawano et al.

[11] Patent Number: 5,634,789
[45] Date of Patent: Jun. 3, 1997

[54] METHOD OF PREFORMING HEAT TREATMENT ON A WOUND ROLL FILM

[75] Inventors: Takashi Nawano; Daisuke Fujikura; Osamu Nagayama, all of Kanagawa, Japan

[73] Assignee: Fuji Photo Film Co., Ltd., Kanagawa, Japan

[21] Appl. No.: 365,364

[22] Filed: Dec. 28, 1994

[30] Foreign Application Priority Data

Dec. 28, 1993 [JP] Japan ................................ 5-350676
Dec. 28, 1993 [JP] Japan ................................ 5-350677

[51] Int. Cl.$^6$ ................................................ G03C 1/76
[52] U.S. Cl. ...................... 432/59; 242/548.4; 242/520; 430/501
[58] Field of Search ........................... 432/8, 14, 59, 432/121, 184, 198; 242/520, 540, 548.4; 430/496, 501

[56] References Cited

U.S. PATENT DOCUMENTS

| 3,900,590 | 8/1975 | Dhoble | 427/22 |
| 5,026,276 | 6/1991 | Hirabayashi et al. | 432/59 |
| 5,114,337 | 5/1992 | Yamazaki | 432/8 |
| 5,171,145 | 12/1992 | Kusaka et al. | 432/59 |
| 5,184,952 | 2/1993 | Nishikura et al. | 432/60 |

FOREIGN PATENT DOCUMENTS

| 52-14451 | 4/1977 | Japan | H05B 9/00 |
| 4247321 | 9/1992 | Japan | G11B 5/84 |
| 519899 | 3/1993 | Japan | B29C 71/02 |

Primary Examiner—Henry A. Bennett
Assistant Examiner—Gregory Wilson
Attorney, Agent, or Firm—Sughrue, Mion, Zinn, Macpeak & Seas

[57] ABSTRACT

Knurling is applied to both side edge portions of a high-molecular film and then the film is wound up. A packing agent is applied to the knurled portions to enclose air at the time of winding in spaces between wound film layers and the film is put into an annealing isothermal chamber while contact between the wound film layers is prevented by the air. Preferably, the high-molecular film is made to pass through a heating zone just before the winding so that the high-molecular film after heated is wound up. More preferably, the winding core used for winding is a hollow porous winding core and high-temperature pressurized air is blown out onto the film through the hollow porous cylindrical surface. In a method of performing heat treatment on a wound roll film in which annealing treatment is performed on a roll film obtained by winding a high-molecular film, comprising the steps of: enclosing a winding portion of a device in a box; keeping the inside of the box at a high temperature equal to that of an annealing chamber; heating the high-molecular film to a temperature equal to the temperature of the inside of the box just before winding and then winding the high-molecular film; and conveying the high-molecular film into an isothermal chamber for annealing treatment.

49 Claims, 2 Drawing Sheets

METHOD OF PREFORMING HEAT TREATMENT ON A WOUND ROLL FILM

BACKGROUND OF THE INVENTION

The present invention relates to a method of performing heat treatment on a high-molecular film, especially a roll film having knurled portions in both side edges.

A high-molecular film, especially a polyester film, is subjected to heat treatment in order to remove its residual distortion which has been sustained in the process of production thereof. This is called annealing treatment. For this annealing treatment, a method in which a wound roll film is preserved in a high-temperature isothermal chamber for a time longer than a predetermined time or a method in which a wound roll film is treated in a continuous furnace at a low speed is carried out. If the roll film is heated unevenly in this process, there arise a problem of tightening, creasing and weaving in winding state in connection with the winding core, and another problem such as long time preservation of the wound roll film, and so on.

To make a measure against those problems, there are a method (1) in which to relax the influence of the winding core, a film having a thermal expansion coefficient not larger than the wound film is wound under on the winding core and annealing treatment is performed on the whole (see Japanese Patent Unexamined Publication No. Hei-4-247321), an apparatus (2) in which dielectric heating is used as a heating method at the time of winding in production so as to cope with gradual increase of the diameter of the wound roll so that heating is carried out at an equal distance from the roll surface, and, in addition, the winding pressure is adjusted (see Japanese Patent Examined Publication No. Sho-52-14451), a method (3) in which a wound roll film is heated in a heating furnace in a state that a spacer is put between both edge portions of the film before winding, and then the film is preserved in the heating furnace for a predetermined time after winding (see Japanese Patent Examined Publication No. Hei-5-19899), and so on.

The method described in Japanese Patent Unexamined Publication No. Hei-4-247321, however, requires a surplus of under winding, so that there are disadvantages in equipment, material and working. The apparatus described in Japanese Patent Examined Publication No. Sho-52-14451 requires expensive and complex equipment. The method described in Japanese Patent Examined Publication No. Hei-5-19899 is insufficient in its effect against creasing, weaving, etc. in the winding state because a gap is interposed between the spacer and the film so that air between film layers is leaked.

An object of the present invention is to solve the aforementioned problems and to provide a method of performing heat treatment on a wound roll film in which annealing treatment can be carried out in bulk so as to obtain a sufficient effect against creasing, weaving, etc. in the winding state without the necessity of surplus equipment, material, working, etc. and without the necessity of complex equipment.

SUMMARY OF THE INVENTION

In accordance with this invention, knurling is applied to both edge portions of a high-molecular film and then the film is wound up. A packing agent is applied to the knurled portions to enclose air at the time of winding in spaces between wound film layers and the film is put into an annealing isothermal chamber while contact between the wound film layers is prevented by the air. Preferably, the high-molecular film is made to pass through a heating zone just before the winding so that the high-molecular film after heated is wound up. More preferably, the winding core used for winding is a hollow porous winding core and high-temperature pressurized air is blown out onto the film through the hollow porous cylindrical surface.

This invention also proposes that in a method of performing heat treatment on a wound roll film in which annealing treatment is performed on a roll film obtained by winding a high-molecular film, comprising the steps of: enclosing a winding portion of a device in a box; keeping the inside of the box at a high temperature equal to that of an annealing chamber; heating the high-molecular film to a temperature equal to the temperature of the inside of the box just before winding and then winding the high-molecular film; and conveying the high-molecular film into an isothermal chamber for annealing treatment.

DETAILED DESCRIPTION OF THE PREFERRED EMBODIMENTS

Figure 1:
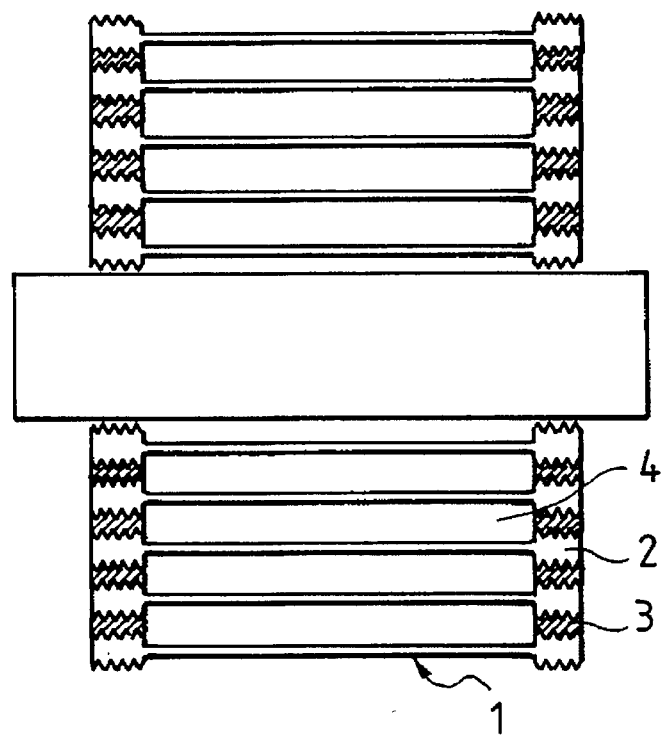
FIG. 1 is a partly front sectional view of an embodiment of the method of performing heat treatment on a wound roll film according to the present invention.

Examples of material for the high-molecular film used in the present invention include polyester such as polyethylene terephthalate, polyethylene naphthalate, etc., polyethylene, polystyrene, polyvinyl alcohol, vinyl chloride, Teflon, vinylidene chloride, Nylon, polypropylene, polycarbonate, polyimide, polyamide-imide, polyesterimide, and so on.

The present invention is particularly useful in the case where a film of polyester such as polyethylene terephthalate, polyethylene naphthalate, etc. of these films is used:

In the present invention, knurling treatment means to form rough portions at both edge portions of the film by sandwiching the film at the edge portions between rollers having roughness so that adjacent film layers of the wound film are made so as not to come into contact with each other by means of the roughness. The knurling is also called "roullette". The knurling gives a gap corresponding to at least one or two sheets of film between adjacent upper and lower film layers by the aforementioned roughness so that adhesion between the upper and lower film layers can be avoided by the gap, while communication of air between the layers with the environment of the outside of the film is kept through the gap caused by the roughness.

In the present invention, the packing agent at the knurled portions serves to fill the so-called knurled roughness therewith to keep airtightness between the interlayer space and the environment. The packing agent is equivalent to so-called filling-up of knurled portions, that is, packing but has no adhesive property. For example, a pressure sensitive adhesive agent generally used in a pressure sensitive adhesive tape may be used or a pressure sensitive adhesive agent composed of silicone and silicone rubber for a heat-resisting tape or a material obtained by mixing a pressure sensitive adhesive resin in NR (natural rubber) may be used.

Enclosing air at the time of winding in spaces between wound film layers means that the final end of the wound film is brought into close contact with the wound roll film by means of a tape or the like.

In the present invention, making the aforementioned high-molecular film pass through a heating zone just before winding means, specifically, that a box is provided as the heating zone before winding and not only the film per se but also the air attached to the film are heated before the film is wound. The temperature of the heating varies in accordance with the material of the high-molecular film and is preferably selected to be in a temperature range not higher than but near the glass transition point of the high-molecular film. For example, a temperature range of from 60° to 70° C. is preferred in the case of polyethylene terephthalate whereas a temperature range of from 100° to 120° C. is preferred in the case of polyethylene naphthalate. In the present invention, the winding core has a hollow cylindrical form having a large number of pores in its surface. That fact that high-temperature pressurized air, for example, in a temperature range of from 60° to 140° C. and a pressure range of from 100 to 700 kPa, while those ranges may vary in accordance with the material, is blown out onto the film through the hollow cylindrical surface means that the core-side inside of the winding roll is positively heated by the high-temperature air and, accordingly, means that air between film layers thermally expands so that the upper and lower film layers are made so as not to come into contact with each other.

In the present invention, enclosing a winding portion of a device in a box means formation of an environment region to enclose a winding roll, specifically, to enclose it at an irreducible minimum. A winding device and other devices attached thereto may be provided in the box. Keeping the inside of the box at a high temperature equal to that of an annealing chamber means winding the film after heightening the temperature of the film sufficiently. It is preferable to select the temperature for heating to be in a range of from 60° to 140° C. Any heating method may be used for heating the inside of the box.

In the present invention, heating the high-molecular film to a temperature equal to the temperature of the inside of the box just before winding and then winding the high-molecular film means heating the film to the temperature of the inside of the box in a range of from 60° to 140° C. As the heating method therefor, it is preferable to provide a heating roller in the box. It is preferable to conduction-heat the film directly by using a dielectric heating roller, a ceramic heater or a steam heating roller.

By heating the film before winding to a temperature near to the annealing temperature as described above, the influence of expansion/contraction from the outside to the inside of the winding roll is reduced, so that tightening, creasing, weaving, etc. in the winding state can be prevented from occurring.

EXAMPLE

Example-1

As shown in FIG. 1, with respect to a polyethylene terephthalate film and a polyethylene naphthalate film each having a thickness of from 85 to 100 μm, knurling 2 was applied to both edge portions of a wound roll film 1. A packing agent 3 was applied to the knurled portions 2 to enclose air 4 at the time of winding in spaces between wound film layers, and the wound roll film was put into an annealing isothermal chamber in a state in which the wound film layers were not in contact with each other by the air. In the case of polyethylene terephthalate, the film was heated at a temperature in a range of from 60° to 70° C. for a time in a range of from 48 to 72 hours. In the case of polyethylene naphthalate, the film was heated at a temperature in a range of from 110° to 120° C. for a time in a range of from 48 to 72 hours. The air between the film layers was heated so as to expand thermally because of heat in the isothermal chamber, so that contact between the film layers was reduced. As a result, in each of the films, the occurrence of creasing and weaving in the winding state could be prevented perfectly. Particularly in the case of polyethylene naphthalate, an effect upon the behavior of curling was observed and it was found from the state of the winding roll that the resulting film had good flat characteristic when the film was returned to a flat state and had excellent curling recovery as a photographic light-sensitive material support.

In addition, it is preferable that the heated air is enclosed in spaces between the film layers and the film per se is heated at the time of winding of the film.

Example-2

Figure 2:
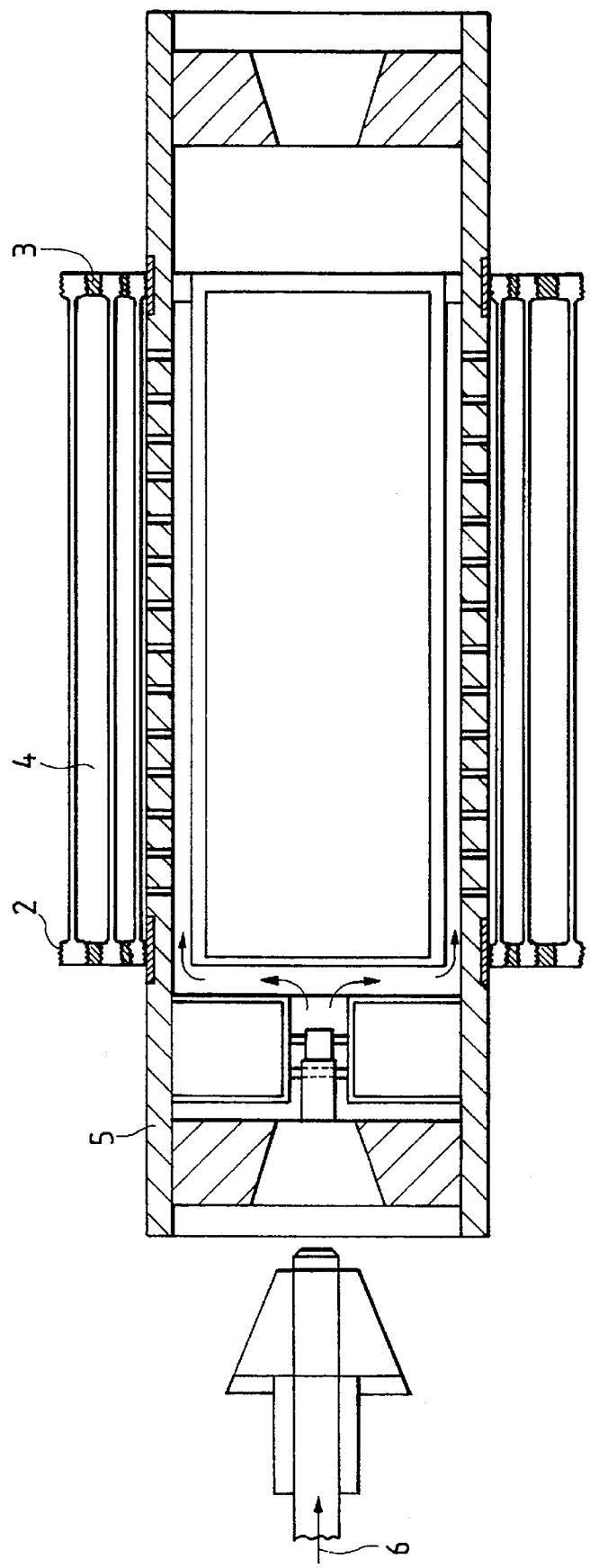
FIG. 2 is a partly front sectional view of another embodiment of the method of performing heat treatment on a wound roll film according to the present invention.

As shown in FIG. 2, in addition to Example-1, heating was applied to a winding core by using the same film and the same condition range as in Example-1. That is, a hollow porous winding core 5 was used. High-temperature pressurized air 6 was blown out onto the film through the hollow cylindrical surface of the winding core so that air 4 between film layers was heated securely so as to expand, and contact between web portions of the film was avoided. As a result, the same effect as in Example-1 was obtained in that the creasing, weaving, or the like in the winding state, could be prevented from occurring perfectly, and so on.

Example-3

Figure 3:
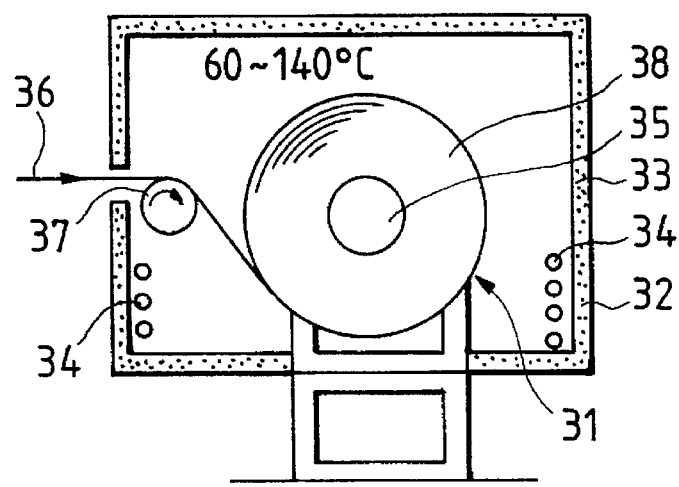
FIG. 3 is a side view of an embodiment of the method of performing heat treatment on a wound roll film according to the present invention.

As shown in FIG. 3, a winding portion 31 of a device is enclosed in a box-like container 32 and the inside of the box-like container 32 is kept at a high temperature in a range of from 60° to 120° C. equal to that of an annealing chamber. The temperature of the annealing chamber is selected suitably in accordance with the material for the film to be treated. For example, in the case of polyethylene terephthalate film, the temperature is selected to be in a range of from 60° to 70° C. and, in the case of polyethylene naphthalate film, the temperature is selected to be in a range of from 100° to 120° C.

For heating the inside of the box in this occasion, hot wind may be blown into the box or a heater 34 may be provided in the box. The outside of the box is enclosed by a heat insulating material 33. The thickness, width and winding length of a film 36 are selected to be in a range of from 10 to 100 μm, in a range of from 150 mφ to 1000 mmφ and in a range of from 1000 m to 3000 mm, respectively.

A winding core 35 used for winding is enclosed in the box-like container 32 so as to be heated to the in-box temperature in a range of from 60° to 140° C. With respect to the film to be wound up, a heating roller 37 capable of being brought into direct contact with the film 36 is used so that the film 36 is heated to a temperature equal to the in-box temperature because of the contact between the film 36 and the heating roller 37 and then wound up. The thus wound roll 38 has a uniform temperature distribution from the winding core 35 to the outer circumference of the winding so that there is no difference in thermal contraction/expansion, and there is therefore no occurrence of creasing and weaving in the winding state.

Immediately after winding, the wound roll 38 is taken out of the box and conveyed into an isothermal chamber (not shown) for annealing. In this occasion, the temperature of the surface of the wound roll falls because of the ordinary temperature atmosphere but there is no large influence because only several turns of the outer circumference of the roll 38 are subjected to the falling of the temperature. Then, a necessary annealing treatment is carried out. In cooling after the annealing treatment, the web contracts but there is no problem because softening of the web is little at the time of cooling. Alternatively, the web may be conveyed to the next step while it is kept at the annealing temperature without being subjected to any special cooling treatment. In this occasion, cooling advances slowly during the conveyance so that there arises an effect in that tightening and creasing in the winding state hardly occur.

In the method of performing heat treatment on a wound roll film according to the present invention, air between roll film layers is heated so as to expand so that contact between the film layers is prevented. As a result, not only uniform heating can be made without creasing, distortion or damaging but also a great deal of bulk rolls can be treated. When, for example, the invention is applied to a polyethylene terephthalate film and a polyethylene naphthalate film used as a high-molecular film for a photographic light-sensitive material support, a support excellent in flat characteristic and adapted to uniform application of an emulsion can be obtained. Particularly in the case of polyethylene naphthalate, it has been found that there arises a curling recovery effect.

By carrying out the heating method according to the present invention, losses due to tightening, creasing and weaving in the winding state which have conventionally occurred at the time of heating of a bulk roll can be eliminated so that a large loss reducing effect is obtained.

Further, because a conventional device can be used as the isothermal chamber and because only a space for one bulk roll is required for the casing of the winding portion, minimum equipment will suffice and a heavy investment for equipment can be avoided.

Because the temperature distribution is made uniform both in the direction of the radius of the roll and in the direction of the axis of the roll by using this heating method, a support good in flat characteristic is obtained without occurrence of any tightening, creasing, weaving, etc. in the winding state as a result of the heating. When, for example, the invention is applied to a polyethylene terephthalate film and a polyethylene naphthalate film used as a high-molecular film as a support for photographic light-sensitive material, a support excellent in flat characteristic and adapted to uniform application of an emulsion can be obtained. Particularly in the case of a film of polyethylene naphthalate, it has been found that there arises a curling recovery effect.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A method of performing heat treatment on a wound roll film in which a high-molecular film having two side knurled edge portions is wound and said wound roll film is subjected to annealing treatment, comprising the steps of:

applying a packing agent to said knurled edge portions, enclosing air at the time of winding in spaces between layers of said wound film, and placing said wound roll film into an annealing isothermal chamber in a state where said layers of said wound film are made not to come into contact with each other by said air.

2. A method of performing heat treatment on a wound roll film of claim 1, further comprising the step of passing said high-molecular film through a heating zone just before said winding, so that said high-molecular film is wound while in a heated state.

3. A method of performing heat treatment on a wound roll film of claim 1 or 2, further comprising the step of blowing high-temperature pressurized air onto said film through a winding core used for said winding, wherein the winding core has a hollow porous cylindrical form.

4. A method of performing heat treatment on a wound roll film of claim 1, wherein the high-molecular film is formed from polyethylene terephthalate, and is used as a support for photographic light-sensitive material.

5. A method of performing heat treatment on a wound roll film of claim 4, wherein the heat treatment is performed in a temperature between 60° C. and 70° C.

6. A method of performing heat treatment on a wound roll film of claim 1, wherein the high-molecular film is formed from polyethylene naphthalate, and is used as a support for photographic light-sensitive material.

7. A method of performing heat treatment on a wound roll film of claim 6, wherein the heat treatment is performed in a temperature between 100° C. and 120° C.

8. A method of performing heat treatment on a wound roll film by annealing a roll film obtained by winding a high-molecular film, comprising the steps of:

enclosing a winding portion of a device in a box, keeping the inside of the box at a high temperature equal to that of an annealing chamber, heating said high-molecular film to a temperature equal to the temperature of the inside of the box, and then winding said high-molecular film, and transferring said high temperature film into an isothermal chamber for annealing.

9. A method of performing heat treatment on a wound roll film of claim 8, wherein the high-molecular film is formed from polyethylene terephthalate, and is used as a support for photographic light-sensitive material.

10. A method of performing heat treatment on a wound roll film of claim 8, wherein the high-molecular film is formed from polyethylene naphthalate, and is used as a support for photographic light-sensitive material.

11. A method of performing heat treatment on a wound roll film by annealing a roll film obtained by winding a high-molecular film of claim 8, wherein said heat treatment is performed in a temperature between 60° C. and 140° C.

12. A method of performing heat treatment on a wound roll film of claim 2, wherein the high-molecular film is formed from polyethylene terephthalate, and is used as a support for photographic light-sensitive material.

13. A method of performing heat treatment on a wound roll film of claim 3, wherein the high-molecular film is formed from polyethylene terephthalate, and is used as a support for photographic light-sensitive material.

14. A method of performing heat treatment on a wound roll film of claim 12, wherein the heat treatment is performed in a temperature between 60° C. and 70° C.

15. A method of performing heat treatment on a wound roll film of claim 13, wherein the heat treatment is performed in a temperature between 60° C. and 70° C.

16. A method of performing heat treatment on a wound roll film of claim 2, wherein the high-molecular film is formed from polyethylene naphthalate, and is used as a support for photographic light-sensitive material.

17. A method of performing heat treatment on a wound roll film of claim 3, wherein the high-molecular film is formed from polyethylene naphthalate, and is used as a support for photographic light-sensitive material.

18. A method of performing heat treatment on a wound roll film of claim 16, wherein the heat treatment is performed in a temperature between 100° C. and 120° C.

19. A method of performing heat treatment on a wound roll film of claim 17, wherein the heat treatment is performed in a temperature between 100° C. and 120° C.

20. A support for photographic light-sensitive material, said support comprising a high-molecular film formed from polyethylene terephthalate film, being wound around a winding core, and having two side knurled edge portions, said film prepared by a process comprising the steps of:
  applying a packing agent to said knurled edge portions;
  enclosing air, at a time of winding said film, in spaces between layers of said wound film;
  placing said wound roll film into an annealing isothermal chamber in a state where said layers of said wound roll film are made not to come into contact with each another by said air.

21. A support formed by the process of claim 20, wherein said process further comprises the step of passing said film through a heating zone just before winding, so that said film is wound while in a heated state.

22. A support formed by the process of claim 20, wherein said process further comprises the step of blowing high-temperature pressurized air onto said film through the winding core, wherein the winding core has a hollow porous cylindrical form.

23. A support formed by the process of claim 20, wherein said heat treatment is performed in a temperature between 60° C. and 70° C.

24. A support formed by the process of claim 21, wherein said heat treatment is performed in a temperature between 60° C. and 70° C.

25. A support formed by the process of claim 22, wherein said heat treatment is performed in a temperature between 60° C. and 70° C.

26. A support for photographic light-sensitive material, said support comprising a high-molecular film formed from polyethylene naphthalate film, being wound around a winding core, and having two side knurled edge portions, said film prepared by a process comprising the steps of:
  applying a packing agent to said knurled edge portions;
  enclosing air, at a time of winding said film, in spaces between layers of said wound film;
  placing said wound roll film into an annealing isothermal chamber in a state where said layers of said wound roll film are made not to come into contact with each another by said air.

27. A support formed by the process of claim 26, wherein said process further comprises the step of passing said film through a heating zone just before winding so that said film is wound while in a heated state.

28. A support formed by the process of claim 26, wherein said process further comprises the step of blowing high-temperature pressurized air onto said film through the winding core, wherein the winding core has a hollow porous cylindrical form.

29. A support formed by the process of claim 26, wherein said heat treatment is performed in a temperature between 100° C. and 120° C.

30. A support formed by the process of claim 27, wherein said heat treatment is performed in a temperature between 100° C. and 120° C.

31. A support formed by the process of claim 28, wherein said heat treatment is performed in a temperature between 100° C. and 120° C.

32. A support for photographic light-sensitive material, said support comprising a high-molecular film formed from polyethylene terephthalate film, said film prepared by a process comprising the steps of:
  enclosing a winding portion of a device in a box,
  keeping the inside of the box at a high temperature equal to that of an annealing chamber,
  heating said high-molecular film to a temperature equal to the temperature of the inside of the box, and then winding said heated high-molecular film, and
  transferring said wound, heated high-molecular film into an isothermal chamber for annealing.

33. A support for photographic light-sensitive material, said support comprising a high-molecular film formed from polyethylene naphthalate film, said film prepared by a process comprising the steps of:
  enclosing a winding portion of a device in a box,
  keeping the inside of the box at a high temperature equal to that of an annealing chamber,
  heating said high-molecular film to a temperature equal to the temperature of the inside of the box, and then winding said heated high-molecular film, and
  transferring said wound, heated high-molecular film into an isothermal chamber for annealing.

34. A method of winding film, comprising the steps of:
  knurling edge portions of said film; and
  enclosing air in spaces between layers of said film by applying a packing agent to the knurled edge portions of said film at a time of winding said film around a winding core;
  whereby the enclosed air prevents the layers of said film from contacting one another.

35. A method of heating film, comprising the steps of:
  knurling edge portions of said film;
  enclosing air in spaces between layers of said film by applying a packing agent to the knurled edge portions of said film at a time of winding said film around a winding core; and
  heating said film;
  whereby the enclosed air prevents the layers of said film from contacting one another.

36. The method of heating film as claimed in claim 35, further comprising the step of heating said film before said film is wound around the winding core.

37. The method of heating film as claimed in claim 35, further comprising the step of blowing high-temperature pressurized air onto said film through the winding core, wherein the winding core has a hollow porous cylindrical form.

38. The method of heating film as claimed in claim 35, wherein the film is formed from polyethylene terephthalate.

39. The method of heating film as claimed in claim 38, wherein the heat treatment is performed at a temperature between 60° C. and 70° C.

40. The method of heating film as claimed in claim 35, wherein the film is formed from polyethylene naphthalate.

41. The method of heating film as claimed in claim 40, wherein the heat treatment is performed at a temperature between 100° C. and 120° C.

42. A method of winding film comprising enclosing air in spaces between layers of said film by applying a packing agent to edge portions of said film at a time of winding said film around a winding core, whereby the enclosed air prevents the layers of said film from contacting one another.

43. A method of heating film, comprising the steps of:

enclosing air in spaces between layers of said film by applying a packing agent to edge portions of said film at a time of winding said film around a winding core; and heating said wound film;

whereby the enclosed air prevents the layers of said film from contacting one another.

44. The method of heating film as claimed in claim 43, further comprising the step of heating said film before said film is wound around the winding core.

45. The method of heating film as claimed in claim 43, further comprising the step of blowing high-temperature pressurized air onto said film through the winding core, wherein the winding core has a hollow porous cylindrical form.

46. The method of heating film as claimed in claim 43, wherein the film is formed from polyethylene terephthalate.

47. The method of heating film as claimed in claim 46, wherein the heat treatment is performed at a temperature between 60° C. and 70° C.

48. The method of heating film as claimed in claim 43, wherein the film is formed from polyethylene naphthalate.

49. The method of heating film as claimed in claim 48, wherein the heat treatment is performed at a temperature between 100° C. and 120° C.

* * * * *